United States Patent [19]

Wartian

[11] Patent Number: 5,157,806
[45] Date of Patent: Oct. 27, 1992

[54] DOOR CLOSING PISTON-CYLINDER ASSEMBLY

[76] Inventor: George Wartian, 34938 Island View Dr., E., Mt. Clemens, Mich. 48045

[21] Appl. No.: 803,978

[22] Filed: Dec. 9, 1991

[51] Int. Cl.⁵ .......................... F16F 9/32; E05F 3/00
[52] U.S. Cl. ........................................ 16/66; 16/49; 16/84; 267/64.11; 267/120
[58] Field of Search .............. 16/49, 66, 82, 84; 267/64.11, 64.13, 64.15, 120

[56] References Cited

U.S. PATENT DOCUMENTS

| | | | |
|---|---|---|---|
| 3,266,080 | 8/1966 | Spencer | 16/84 |
| 4,230,309 | 10/1980 | Schnitzius | 16/66 |
| 4,854,554 | 8/1989 | Ludwig | 16/66 |
| 4,920,609 | 5/1990 | Lin | 16/66 |

*Primary Examiner*—W. Donald Bray
*Attorney, Agent, or Firm*—Barnes, Kisselle, Raisch, Choate, Whittemore & Hulbert

[57] ABSTRACT

A door closing piston-cylinder assembly which is designed to permit the door initially to move to closed position relatively rapidly but with controlled restraint until it approaches the fully closed position whereupon the door continues to move but considerably more slowly so that it will close smoothly and softly. The cylinder has a large diameter bore adjacent one end and a bore of smaller diameter adjacent the other end. A piston assembly has a first piston dimensioned to reciprocate in the large bore and a second piston of smaller diameter dimensioned to reciprocate in the smaller bore. The pistons have check valves which close when the pistons move in one direction and open when they move in the opposite direction. The smaller piston has a metering valve which is open at all times. A bleeder valve is provided in the end of the cylinder having the small bore. A coil spring is provided to move the pistons in a direction to close the door. The door closing piston-cylinder assembly is operable to control the opening and closing movements of a door relative to a door frame when the door is connected to the cylinder and the door frame is connected to the piston, or visa versa.

8 Claims, 2 Drawing Sheets

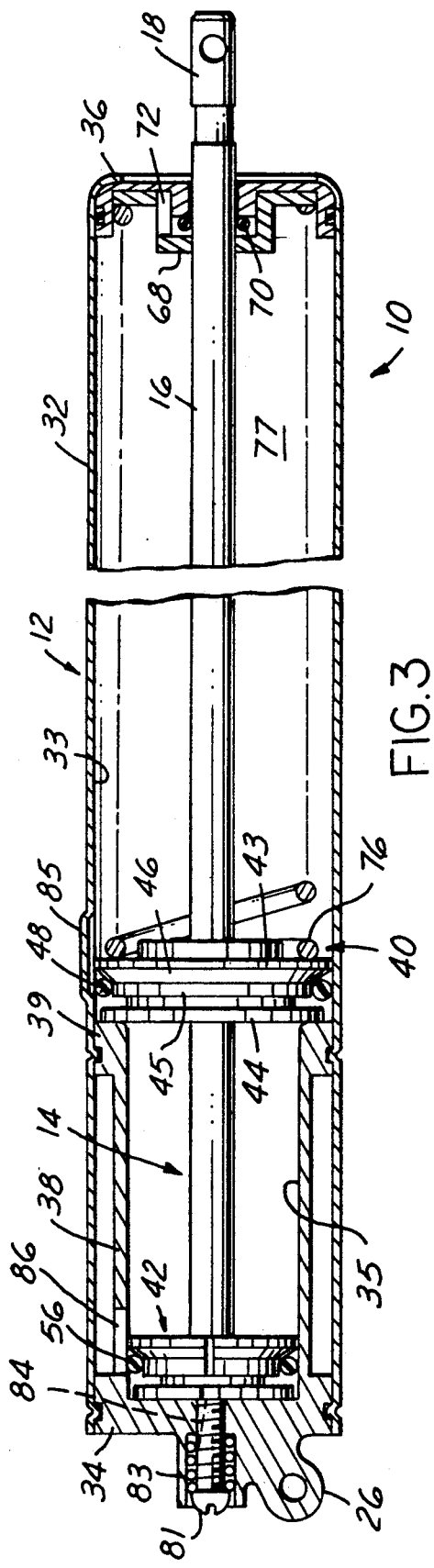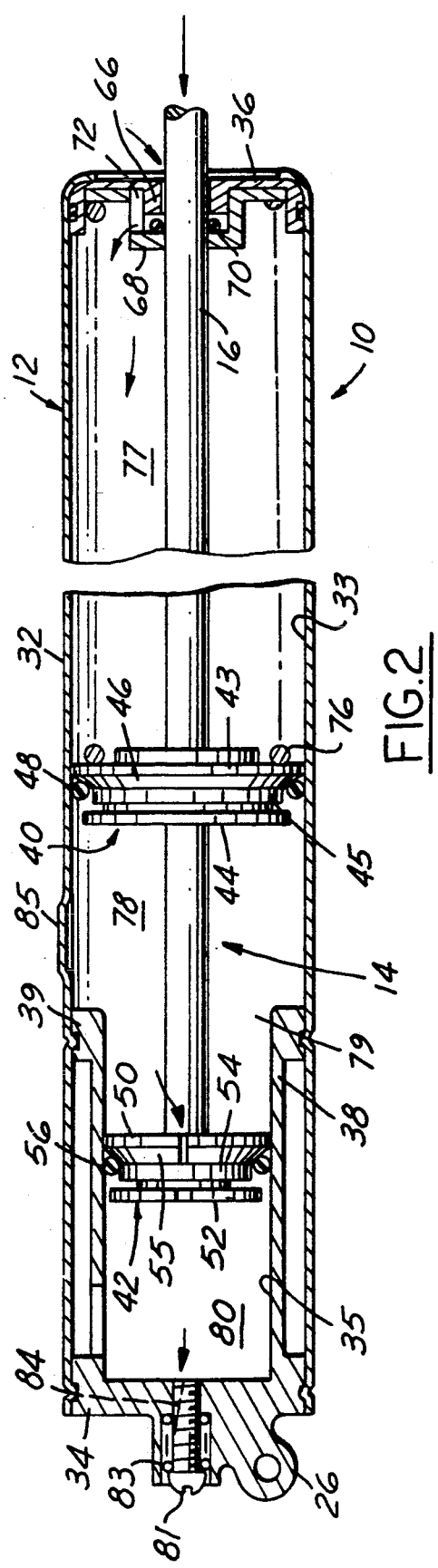

DOOR CLOSING PISTON-CYLINDER ASSEMBLY

This invention relates generally to door closers and refers more particularly to a door closing piston-cylinder assembly adapted to control the opening and closing movements of a door.

BACKGROUND AND SUMMARY OF THE INVENTION

Door closers are commonly used to control the movement of a door between open and closed positions. One common complaint concerning door closers used in the past is that they either permit the door to move too rapidly to the closed position, often shutting with a slam, or they impose too much resistance to closing and hence unduly retard and slow the movement of the door to fully closed position.

It is a primary object of this invention to provide a door closing piston-cylinder assembly which overcomes these objections. The door closing assembly of this invention permits the door to be opened with relative ease, and then on closing movement, the door is allowed initially to move to closed position fairly rapidly but with controlled restraint until it approaches the fully closed position whereupon the door continues to move but considerably more slowly so that it will close smoothly and softly and without a bang. Just before the door reaches fully closed position the restraint on door movement is substantially relieved to allow the door to assume a fully closed and latched position.

Another object of the invention is to provide a door closing assembly which is composed of a relatively few simple parts, is capable of being inexpensively manufactured, is rugged and dependable, and is well-suited for the accomplishment of its intended function.

These and other objects, features and advantages of the invention will become more apparent as the following description proceeds, especially when considered with the accompanying drawings.

BRIEF DESCRIPTION OF THE DRAWINGS

FIG. 2 is a longitudinal sectional view of the door closing assembly, showing the piston assembly near the end of its travel as the door moves towards closed position.

FIG. 3 is a longitudinal sectional view like FIG. 2, but shows the piston assembly in the extreme limiting position adjacent one end of the cylinder when the door is fully closed.

DETAILED DESCRIPTION

Figure 1:
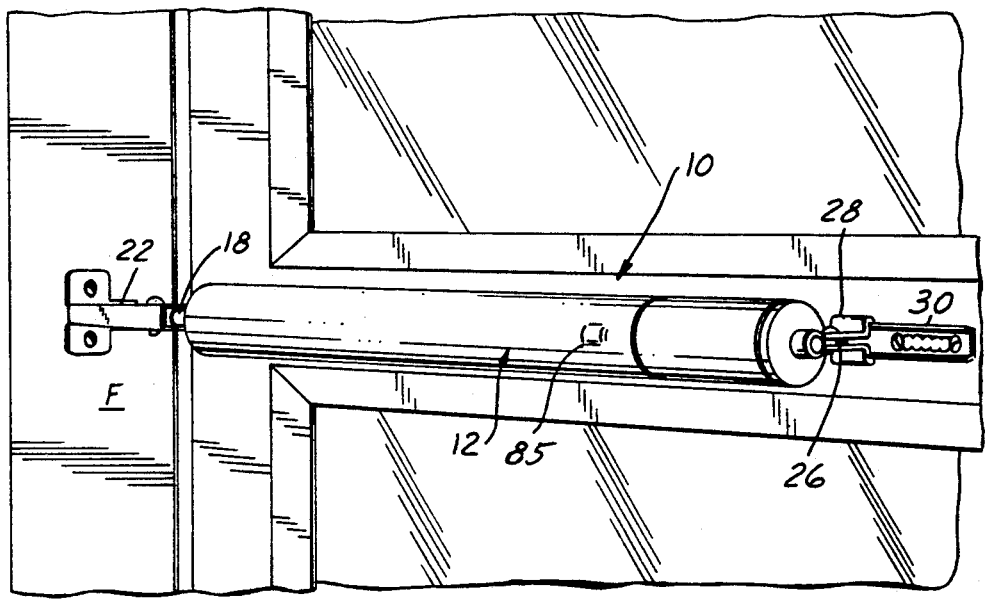
FIG. 1 is a perspective view of a door closing piston-cylinder assembly constructed in accordance with the invention, shown attached to a swinging door.
Figure 5:
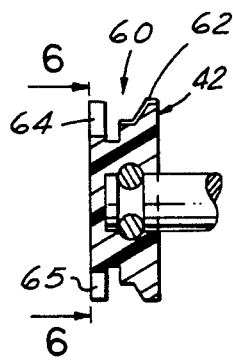
FIG. 5 is a fragmentary sectional view of the smaller piston.
Figure 6:
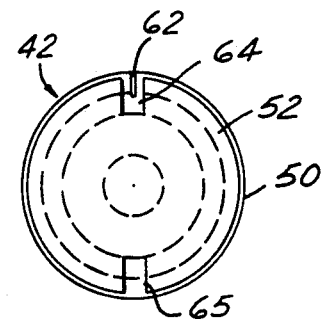
FIG. 6 is a view taken on the line 6—6 in FIG. 5.

Referring now more particular to the drawings, the door closing piston-cylinder assembly 10 comprises an elongated air cylinder 12, a piston assembly 14 reciprocable within the cylinder 12, and a piston rod 16 extending axially from the piston assembly through one end of the cylinder and having a terminal portion 18 outside the cylinder. As seen in FIG. 1, the terminal portion 18 of the piston rod is pivoted to a bracket 22 mounted on a door frame member F. The cylinder has a mounting portion 26 at one end pivoted to a bracket 28 secured in adjusted position on a mounting plate 30 attached to the door D. The door D is hinged to the door frame member F for swinging movement between open and closed positions.

The cylinder 12 is formed of an elongated tube 32 closed at one end by an end cap 34 and at the opposite end by an end cap 36. Preferably the mounting portion 26 of the cylinder is an integral formation on the end cap 34. The end cap 34 also has a tubular extension 38 which extends concentrically within the tube 32 in radially inwardly spaced relation thereto, extending into the tube 32 for a distance which is only a relatively small fraction of the overall length of the cylinder. The inner end of this tubular extension 38 has an annular flange 39 extending radially outwardly and crimped to the wall of the tube 32 as shown. The end cap 34 is also crimped to the wall of the tube 32. The tube 32 provides the cylinder 12 with a relatively large bore 33 of uniform circular cross-section extending from the end cap 36 to the flange 39 on the tubular extension 38. The tubular extension 38 has a smaller bore 35 which also is of uniform circular cross-section throughout its length and is in open communication with bore 33.

The piston 14 comprises two pistons 40 and 42 secured to the piston rod 16 in axially spaced apart relation. The piston 40 has axially spaced circular rims 43 and 44. Rim 43 is relatively large and of a diameter only slightly less than the bore 33 of the tube 32 to facilitate an easy sliding movement. Rim 44 is of a smaller diameter than rim 43. Between the rims 43 and 44, the piston 40 has a central circular portion 45 of even smaller diameter than the rim 44, which is connected to the rim 43 by a frustoconical surface 46. An O-ring 48 encircles the central circular portion 45.

The piston 42 is of substantially the same basic configuration as the piston 40. That is, it has a relatively large diameter rim 50, a smaller diameter rim 52 spaced axially from the rim 50, and between the rim portions a central circular portion 54 of a diameter even smaller than the rim 52. A frustoconical surface 55 extends between the rim 50 and the central portion 54 of the piston. An O-ring 56 encircles the central portion 54. The larger diameter rim 50 is only slightly smaller in diameter than the bore 35 of the tubular extension 38 to facilitate reciprocation therein.

The piston 42 has a metering orifice 60 provided by a groove 62 in the peripheral portion of the rim 50, the frustoconical surface 55 and the central portion 54, and a notch 64 in the periphery of the rim 52 aligned with groove 62. A second notch 65 in rim 52 is diametrically opposite notch 64. This metering orifice 60 permits the flow of air from one side of the piston 42 to the other at all times.

The end cap 36 has a central hub 66 through which the piston rod 16 extends. A cup 68 is fitted over the hub. The piston rod extends loosely through the hub 66 and through the base of cup 68. An O-ring 70 in the cup is sleeved on and surrounds the piston rod. A slot 72 is provided in the side wall of the cup 68. When the piston rod is extended towards the right in FIGS. 2–4 the O-ring 70 seals against the rod 16 and the hub 66, preventing flow of air ahead of the piston from being forced out of the cylinder. When the piston rod is withdrawn into the cylinder (to the left in FIGS. 2-4) the O-ring 70 moves away from the hub (see FIG. 2) enabling the piston to draw outside air into the cylinder through slot 72.

Figure 4:
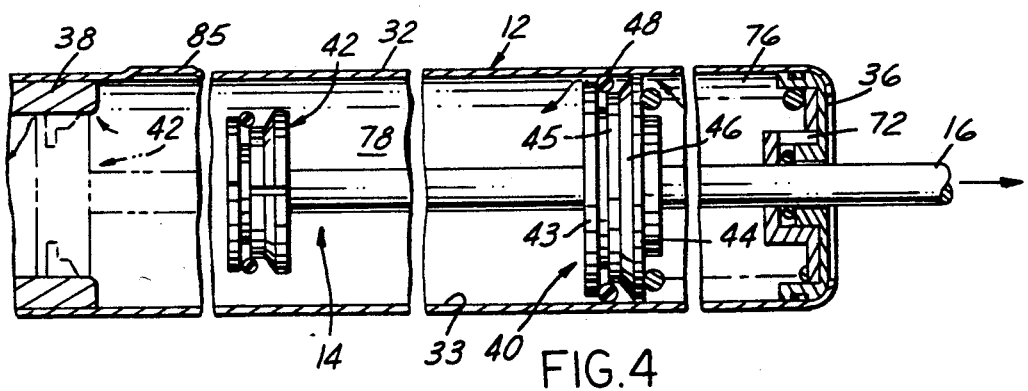
FIG. 4 is a fragmentary longitudinal sectional view showing the position of the piston assembly within the cylinder as it moves towards the opposite end of the cylinder to its other limiting position in which the door is fully open, the dotted lines showing the smaller piston in another position.

When the piston assembly moves left in FIGS. 2-4 to withdraw the piston rod, the O-ring 48 seals between the frustoconical surface 46 of the piston 40 and the wall of the bore 33, preventing the flow of air across the piston. The O-ring 56 seals between the frustoconical surface 55 of the piston 42 and the wall of the bore 35 preventing the flow of air across piston 42.

When the piston assembly moves right, these O-rings 48 and 56 move away from the bore 33 of the tube and the bore 35 of the cylindrical extension 38 and allow air to by-pass the pistons.

A compression coil spring 76 within the cylinder 12 is compressed between the piston 40 and the end cap 36, urging the piston assembly to the left in FIGS. 2-4 which is the direction of closing movement for the door. The space within the bore 33 between piston 40 and the end cap 36 defines a chamber 77. The space at the opposite side of the piston 40 within the bore 33 and bore 35 defines a chamber 78. When the piston assembly moves far enough leftward so that the smaller piston 42 enters the bore 35, the smaller piston divides chamber 78 into two sub-chambers 79 and 80.

There is a bleeder valve 81 in the end cap 34. The bleeder valve 81 is in the form of a cap screw which threads into the end cap. The screw 81 has a tapered slot 84. By threading the cap screw in or out, the effective size of the slot can be varied. The cap screw 81 is held in adjusted position by means of a compression coil spring 83 compressed between the end cap and the head of the cap screw.

A bulge 85 in the wall of the cylinder 32 provides a by-pass around the piston 40 when the piston 40 is at or near the FIG. 3 position in which it abuts the flange 39 on the tubular extension 38 in the closed position of the door. A by-pass is also provided around the smaller piston 42 when in the FIG. 3 position, provided by the slot 86 in the tubular extension 38.

In operation, and assuming the door is being opened from an initially closed position in which the parts of the piston-cylinder assembly are in the position shown in FIG. 3, the piston rod 16 and piston assembly 14 will move towards the right relative to the cylinder. The O-ring 70 seals to prevent the escape of air ahead of the piston 40 to the outside. However, the O-rings 48 and 56 will move away from the frustoconical surfaces of the pistons, assuming the positions relative to the pistons shown in FIG. 4. As a result, air in the cylinder ahead of the moving pistons can pass over the peripheries of the pistons in the manner shown by the arrows in FIG. 4. Air can be drawn in through the bleeder valve 81 during this movement. Resistance to the opening of the door is thus essentially only that provided by the compression coil spring 76. When the door is fully open, the piston assembly assumes a limiting position in which the smaller piston has moved out of the smaller bore 35 and is inside the larger bore 33 as shown in FIG. 4.

When the open door is released, the compression coil spring 76 will move the piston assembly 14 to the left in FIGS. 2-4 and this movement is initially fairly rapid. The O-ring 70 moves to the left as in FIG. 2 to unseal and allow outside air to enter the chamber 77 behind piston 40. The O-ring 48 for piston 40 seals to prevent air ahead of the piston to flow across the piston to the rear side thereof. The air ahead of piston 40 is therefore forced out of the cylinder through the bleeder valve 81. The speed with which the piston assembly travels, and hence the speed with which the door closes, is a function of the setting of the bleeder valve.

Once the smaller piston 42 enters the small bore 35, the O-ring 56 seals against the wall of bore 35. As the piston assembly continues moving leftward from the FIG. 2 position, the sub-chamber 79 becomes smaller and any air in the sub-chamber 79 is forced through the metering orifice 60 in the small piston 42, thereby significantly slowing the closing movement of the door. When the door reaches a position in which it is almost closed, the two by-passes 85 and 86 take over, by-passing the metering orifice 60 in the piston 42 and allowing air to pass from sub-chamber 80 to sub-chamber 79 and from sub-chamber 79 to chamber 77 so that the door moves to fully closed position quickly. When fully closed, the parts of the piston-cylinder assembly assume the FIG. 3 position.

What is claimed is:

1. A door closing piston-cylinder assembly comprising an elongated air cylinder having first and second ends, said cylinder having a first bore adjacent said first end of said cylinder, said cylinder having a second bore of smaller diameter than said first bore adjacent said second end of said cylinder, a piston assembly comprising a first piston dimensioned to reciprocate in said first bore and a second piston of smaller diameter than said first piston dimensioned to reciprocate in said second bore, means rigidly connecting said first and second pistons to one another in longitudinally spaced apart relation, said first piston, said cylinder and said first end of said cylinder defining a first chamber between said first piston and said first end of said cylinder, said first piston, said cylinder and said second end of said cylinder defining a second chamber between said first piston and said second end of said cylinder, said second piston, when disposed in said second bore, dividing said second chamber into a first sub-chamber between said pistons and a second sub-chamber between said second piston and said second end of said cylinder, said piston assembly being reciprocable between a first limiting position adjacent said one end of said cylinder in which both said pistons are disposed in said first bore and a second limiting position in which said first piston is disposed in said first bore and said second piston is disposed in said second bore, spring means urging said piston assembly to said second limiting position, first check valve means for said first piston operative to close when said first piston moves toward said second end of said cylinder to block the flow of air in said cylinder from said second chamber to said first chamber and operative to open when said piston moves towards said first end of said cylinder to permit the flow of air in said cylinder from said first chamber to said second chamber, second check valve means for said second piston operative to close when said second piston reciprocates in said second bore towards said second end of said cylinder to block the flow of air in said cylinder from said second sub-chamber to said first sub-chamber and operative to open when said second piston reciprocates in said second bore toward said first end of said cylinder to permit the flow of air in said cylinder from said first sub-chamber to said second sub-chamber, a metering valve in said second piston open at all times to permit a restricted flow of air across said second piston from one said sub-chamber to the other, a bleeder valve in said second end of said cylinder permitting the flow of air into and out of said cylinder, a piston rod extending from said first piston through said first bore and through said first end of said cylinder to a terminal portion outside said cylinder, said door closing piston-cylinder assembly being operable to control the opening and closing movements of a door member relative to a door frame member when one of said members is connected to said cylinder and the other of said members is connected to the terminal portion of said piston rod.

2. A door closing piston-cylinder assembly as defined in claim 1, wherein said bleeder valve is adjustable.

3. A door closing piston-cylinder assembly as defined in claim 1, wherein said first check valve means in an O-ring.

4. A door closing piston-cylinder assembly as defined in claim 1, wherein said second check valve means is an O-ring.

5. A door closing piston-cylinder assembly as defined in claim 1, and further including a by-pass around said first piston when said piston assembly is at and near said second limiting position.

6. A door closing piston-cylinder assembly as defined in claim 1, and further including a by-pass around said second piston when said piston assembly is at and near said second limiting position.

7. A door closing piston-cylinder assembly as defined in claim 1, and further including a third check valve means for said first chamber operative to close when said piston assembly moves towards said first end of said cylinder to block the outflow of air from said first chamber and operative to open when said piston assembly moves towards said second end of said cylinder to permit the inflow of air to said first chamber.

8. A door closing piston-cylinder assembly as defined in claim 7, wherein said third check valve means is an O-ring sleeved on said piston rod.

* * * * *